United States Patent [19]
Grenier

[11] 4,044,332
[45] Aug. 23, 1977

[54] HALFTONE DISPLAY, PARTICULARLY FOR A HIGH RESOLUTION RADIOACTIVITY DISTRIBUTION DETECTION SYSTEM

[75] Inventor: Raymond P. Grenier, Wilmington, Mass.

[73] Assignee: Baird-Atomic, Inc., Bedford, Mass.

[21] Appl. No.: 585,329

[22] Filed: June 9, 1975

Related U.S. Application Data

[63] Continuation of Ser. No. 348,993, April 9, 1973.

[51] Int. Cl.² .......... G01T 1/20; G06G 3/14; 178 6.7 R;6.6 R;6.6 B;6.8
[52] U.S. Cl. .................. 364/900; 250/369; 358/283
[58] Field of Search .......... 250/369, 363, 366, 327; 346/74 CR; 340/172.5

[56] References Cited

U.S. PATENT DOCUMENTS

| | | | |
|---|---|---|---|
| 3,509,341 | 4/1970 | Hindel et al. | 250/366 |
| 3,580,995 | 5/1971 | Klensch | 178/6.7 |
| 3,591,806 | 7/1971 | Brill et al. | 250/366 |
| 3,604,846 | 9/1971 | Behane et al. | 178/6.6 R |
| 3,613,103 | 10/1971 | Harris | 346/74 R |
| 3,634,688 | 1/1972 | DiRocco | 250/366 |
| 3,717,762 | 2/1973 | Grenier et al. | 250/366 X |
| 3,742,129 | 6/1973 | Roberts et al. | 178/617 X |
| 3,748,470 | 7/1973 | Barrett | 250/363 |
| 3,752,981 | 8/1973 | Vaszcak | 250/369 X |
| 3,769,508 | 10/1973 | Brunnett et al. | 250/71.5 S |

*Primary Examiner*—Mark E. Nusbaum
*Attorney, Agent, or Firm*—Morse, Altman, Oates & Bello

[57] ABSTRACT

A device for presenting a halftone pictorial presentation composed of dot picture elements by selectively controlling the number of dot picture elements per unit area at locations on a display. In a high resolution radioactivity distribution detection system, the number of detected radioactive elements at XY locations of an array of sensing devices are fed to a computer and stored at corresponding address locations. The number of radioactive events detected at each address location is normalized into Gray scale coded signals as a function of the greatest number of radioactive events detected at any one address location. The normalized Gray scale coded signals are applied to a display for controlling the number of dot picture elements per unit area presented at corresponding XY locations on the display. The number of radioactive events detected at XY locations of the array are presented on the display as a halftone pictorial representation; the greatest number of picture dot elements per unit are being presented as a brighter image.

9 Claims, 8 Drawing Figures

FIG. 5

HALFTONE DISPLAY, PARTICULARLY FOR A HIGH RESOLUTION RADIOACTIVITY DISTRIBUTION DETECTION SYSTEM

This is a continuation, of application Ser. No. 348,993 filed on Apr. 9, 1973.

BACKGROUND OF THE INVENTION

1. Field of Invention

The present invention relates to display systems and more particularly, is directed towards a method and apparatus for presenting a halftone image.

2. Description of the Prior Art

Various display systems have been developed for presenting halftone pictorial representations on cathode-ray tubes. In one type display system, the intensity of the signal presented on the cathode-ray tube is varied as a function of signal strength. In another type display system which utilized dot picture elements the size of the dot picture element varies as a function of signal strength. Such display systems have suffered from the disadvantage of limited contrast and resolution.

SUMMARY OF THE INVENTION

It is an object of the present invention to provide a half-tone display system, particularly adapted for use with a high resolution radioactivity distribution detection system, which does not suffer from the heretofore mentioned disadvantages. In a high resolution radioactivity distribution detection system, radioactive events emitted from a subject under diagnosis are detected at XY locations of an array of sensing devices. The detected events at each XY location are accumulated and stored in corresponding address locations in a computer. The number of detected events stored at each address location is normalized into Gray scale coded signals as a function of the greatest number of detected events at any one address location. The normalized Gray scale coded signals are applied to a random access memory. The signals in the random access memory are fed selectively to a driver monitor driver via a read-only memory for controlling the number of dot picture elements per unit area at XY locations on a display, the XY locations on the display corresponding to the address location in the random access memory. The number of radioactive events detected at each XY location of the array is presented at corresponding XY locations on the display as a number of picture dot elements, the greatest number of detected events being represented by the greatest number of picture dot elements per unit area. The combination of high resolution radioactivity distribution detection system and halftone display system is such as to provide a highly contrasted image of detected radioactive events.

The invention accordingly comprises the method steps and system possessing the construction, combination of elements, and arrangement of parts that are exemplified in the following detailed disclosure, the scope of which will be indicated in the appended claims.

BREIF DESCRIPTION OF THE DRAWINGS

For a fuller understanding of the nature and objects of the present invention, reference should be had to the following detailed description taken in connection with the accompanying drawings wherein:

FIGS. 5a–5d are graphical representations illustrating an alternate scheme of picture dot element presentation.

DETAILED DESCRIPTION OF THE INVENTION

A radioactivity distribution system detects the relative concentrations of a radioactive isotope at various depths within a section of a specimen containing an unknown distribution of radioactive events. In accordance with the teachings of the present invention, the detected radioactive events are processed in a conversion unit and presented as a halftone image on a display.

Figure 1:
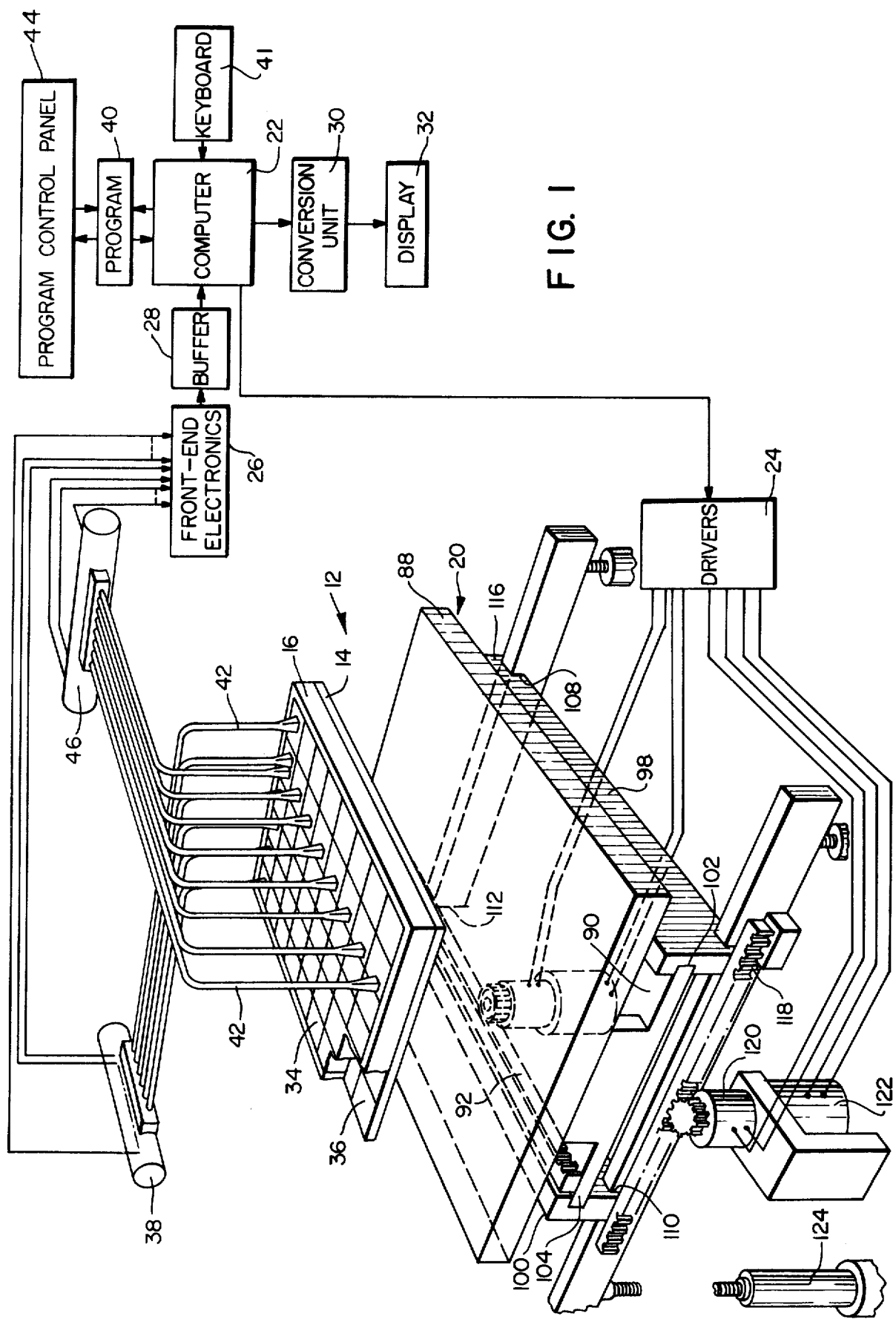
FIG. 1 is a block and schematic diagram of a high resolution radioactivity distribution detection system having a halftone display system made in accordance with the teachings of the present invention.

Referring now to FIG. 1, there is shown a radioactivity distribution detection system 10 which comprises a detector assembly 12 including a photoetched focused collimator 14 and an array 16 of individual scintillators. In the illustrated embodiment, collimator 14 is a multiplane focused collimator characterized by at least two different focal lengths. A subject under diagnosis (not shown) is positioned on a programmable XY platform 20 which is in spaced relationship to detector assembly 12, a section of the subject under diagnosis being in registration with collimator 14. In response to command signals generated by a computer 22, scanning signals are generated by a driver 24 which operates to move platform 20 in a specified scanning pattern. Individual scintillation events in detector assembly 12 are sensed and the coordinate position of each event is digitized in front-end electronics 26 which may be of the type shown in U.S. Pat. Nos. 3,777,142; 3,787,685 and 3,793,520.

Figure 3:
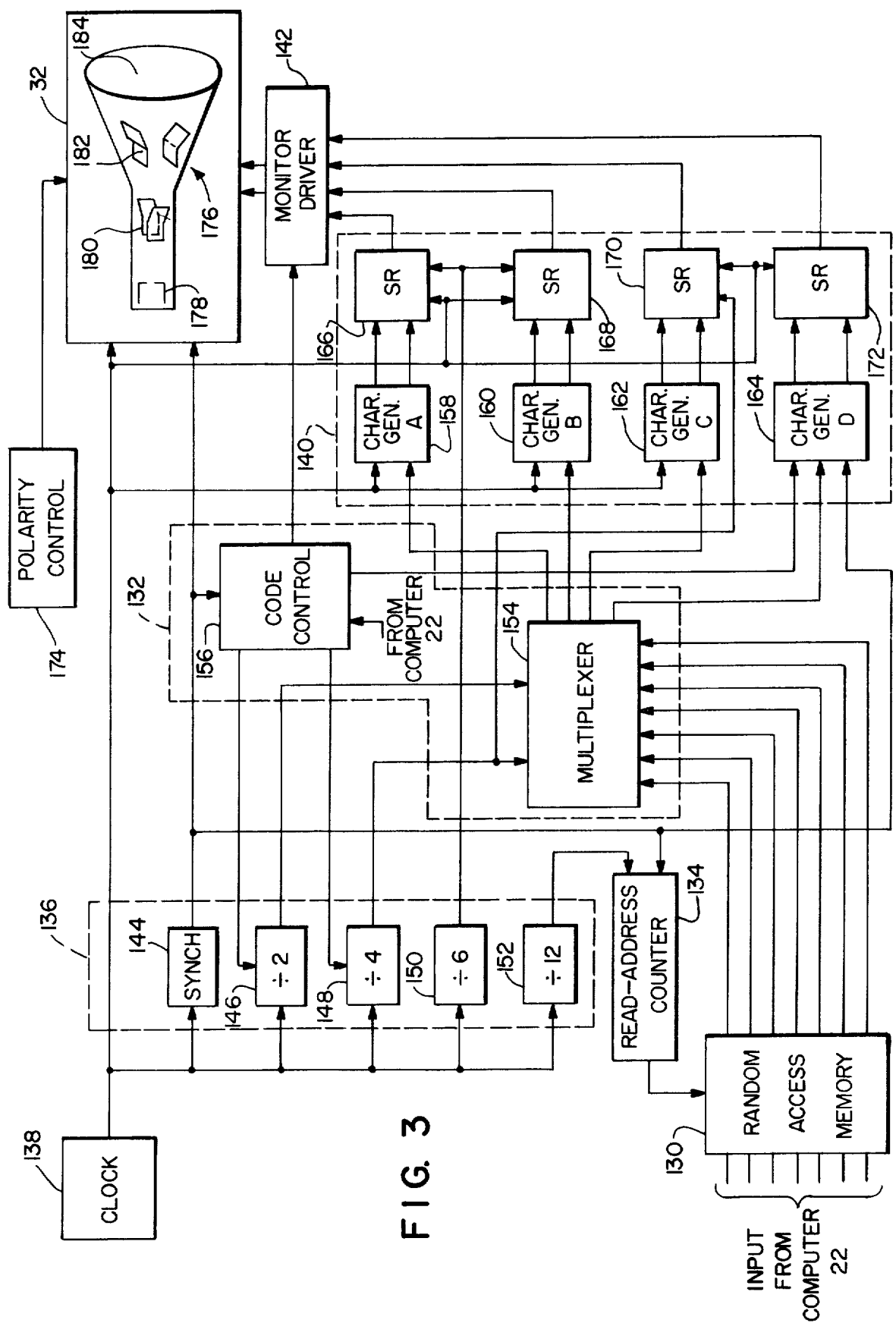
FIG. 3 is a detailed block and schematic diagram of the halftone display system of FIG. 2.

All acceptable data sensed by detector 12 and passed through front-end electronics 26 is accumulated and stored in a buffer memory 28. Each event sensed at a particular XY location of the subject, defined by the XY position of platform 20 with respect to detector 12, is addressed into memory 28 and accumulated to previous events having the same address. The number of events stored at a given address is the number of recorded disintegrations having originated within the monitored subject at a point, the XY location of which corresponds to the given address. Following the accumulation period, the accumulated data in raw digital form is fed to computer 22 and stored in corresponding address locations. As hereinafter described, the data in computer 22 is normalized into Gray scale coded signals as a function of the greatest number of detected events at any one address location and fed to a halftone conversion unit 30, the details of which are shown in FIG. 3. Signals generated by halftone conversion unit 30 are applied to a display 32 for controlling the number of dot picture elements per unit area at XY display locations which correspond to the address locations.

In the illustrated embodiment, detector 12 is an electro-optical system comprising array 16 of individual radioactive sensitive elements 34, typically distributed in columns of 21 elements and in rows of 14 elements. Each detecting element 34 is a scintillator composed of, for example, a thallium activated sodium iodide crystal or a cesium crystal. Scintillator array 16 is mounted in spaced registration with collimator 14 which includes a plurality of tapered collimator bores 36. Each scintillator 34 is disposed in registration with one tapered collimator bore 36. Array 16 is optically coupled to photomultiplying devices 38 and 40 via light pipes 42. Photomultiplier 38 includes a plurality of photodetectors (not shown), one photodetector for each column of scintillators 34. Photomultiplier 40 includes a plurality of photodetectors (not shown) for each row of scintillators 34. Each photodetecting device is optically coupled to its associated detecting element by means of light pipes 42, typically composed of a material which transmits the wavelengths emitted from the scintillator, for example, an acrylic resin such as a methyl methacrylate, a clear epoxy, glass and the like. That is, each photomultiplier is connected to a plurality of photodetectors and each photodetector is optically coupled to one scintillator in a row or column. It will be understood that each event sensed by a detecting element 34 produces an output signal which is multiplied by the photomultiplying devices 38 and 40. By reason of their optical coupling, these photomultiplying devices provide information as to the XY coordinate position of the sensed radioactivity event. Each detecting element 34 within array 16 causes a response in only one unique pair of photodetectors In consequence, the arrangement of detecting elements 34, light pipes 42 and the photodetectors is such as to provide a technique for obtaining digital information from crystal array 16, each unique pair of photodetectors providing X and Y coordinate signal data. The occurrence of a scintillation event in any one scintillator 34 is sensed and its coordinate XY position is digitally encoded in front-end electronics 26 and fed into memory 28. An example of front end electronics for processing scintillation events is disclosed in U.S. Pat. No. 3,634,688 in the name of James V. Di Rocco, dated Jan. 11, 1972 and assigned to the assignee hereof. The number of scintillation events for each step of the program scanning sequence is accumulated in a corresponding XY location in memory 28, for example a 294 word coincident current core memory. Upon completion of each scanning step, the events stored in memory 28 for that XY location of the subject with respect to detector 12 and coupled in parallel to computer 22 and memory 28 is cleared. That is, as platform 20 is moved to the next XY position, the events accumulated in memory 28 for the previous XY position of platform 20 are fed to computer 22 and memory 28 is cleared and readied for reception of new data. Operation of the system is directed from a control panel 44 which may be a series of interconnected switching devices that are interconnected to computer 22 via a programmer 46. A manual data input 41, for example a keyboard, is provided for logging any pertinent data in display 32.

Programmable XY platform 20 comprises a table 88 which is mounted to a slidable member 90. A rack 92 which engages a pinion 94 of a drive 96 is mounted to member 90. Member 90 is slidably received in guideways 98, 100 which are provided in parallel guides 102, 104, respectively, rack 92 being in parallel spaced relationship with guides 102, 104. Guideway 97 extends along the longitudinal axis of guide 102 and guideway 100 extends along the longitudinal axis of guide 104. Guides 102 and 104 are formed also with a pair of transverse guideways 106, 108 and 110, 112, respectively. Guideway 106 is in registration with guideway 110 and guideway 108 is in registration with guideway 112. Fixed guides 114 and 116 are slidably received in guideways 106, 110 and 108, 112, respectively. Fixed guides 114 and 116 are in parallel spaced relationship with one another and in perpendicular spaced relationship with guides 102, 104. Mounted to guides 102, 104 in parallel spaced relationship with guides 114, 116 is a rack 118 which engages a pinion 120 of a drive 122. It will be realized from the foregoing description that table 88, member 90 and rack 92 are slidable in a first direction within guideways 98, 100; and guides 102, 104 and rack 118 are slidable in a second direction within guideways 106, 108 and 110, 112; the first and second directions being mutually perpendicular to one another. For convenience, by way of example, the first and second directions will be referred to as the X and Y directions, respectively. That is, drive 96 operates to move table 88 in the X direction and drive 122 operates to move table 88 in the Y direction. Drives 96 and 122, for example stepping motors, are controlled by signals generated by driver 24 in response to command signals from computer 22. It is to be understood that platform 20 is movable also in the Z axis by means of jack screws 124, for example.

Computer 22 is programmed to move platform 20 in a scanning sequence of 16, 8 or 4 incremental steps, each step being an integral multiple of the distance between adjacent scintillators 34. Since detector 12 comprises 294 elements arranged in columns of 21 and in rows of 14, each incremental step measures 294 independent spatial segments which corresponds to the 294 spatial segments of multi-bore collimator 14. Each collimator bore is used to limit the field of view of each scintillator 34 to a unique spatial segment in the object being measured. In this manner, an image of the organ under diagnosis is obtained which is made up on 294 picture elements corresponding to the 294 unique spatial segments isolated by multi-bore collimator 14. The shape and volume of each separate spatial segment in the object is defined solely by the geometry of each collimator bore. Multi-bore collimator 14 breaks up the organ into 294 equal spatial elements which are then presented as 294 picture elements on display 32. As hereinafter described in connection with FIGS. 2–5, each picture element is comprised of a number of dot picture elements which are presented on display 32 as a halftone image by selectively controlling the number of dot picture elements per unit area for each picture element. The number of radioactive events detected at each XY location of array 16 are accumulated and stored in corresponding address locations in computer 22. In the illustrated embodiment, by way of example, the number of detected events at each address location in computer 22 is normalized in computer 22 into Gray scale coded signals as a function of the greatest number of detected events at any one address location. The normalized Gray scale coded signals generated by computer 22 are fed to conversion unit 30.

Figure 2:
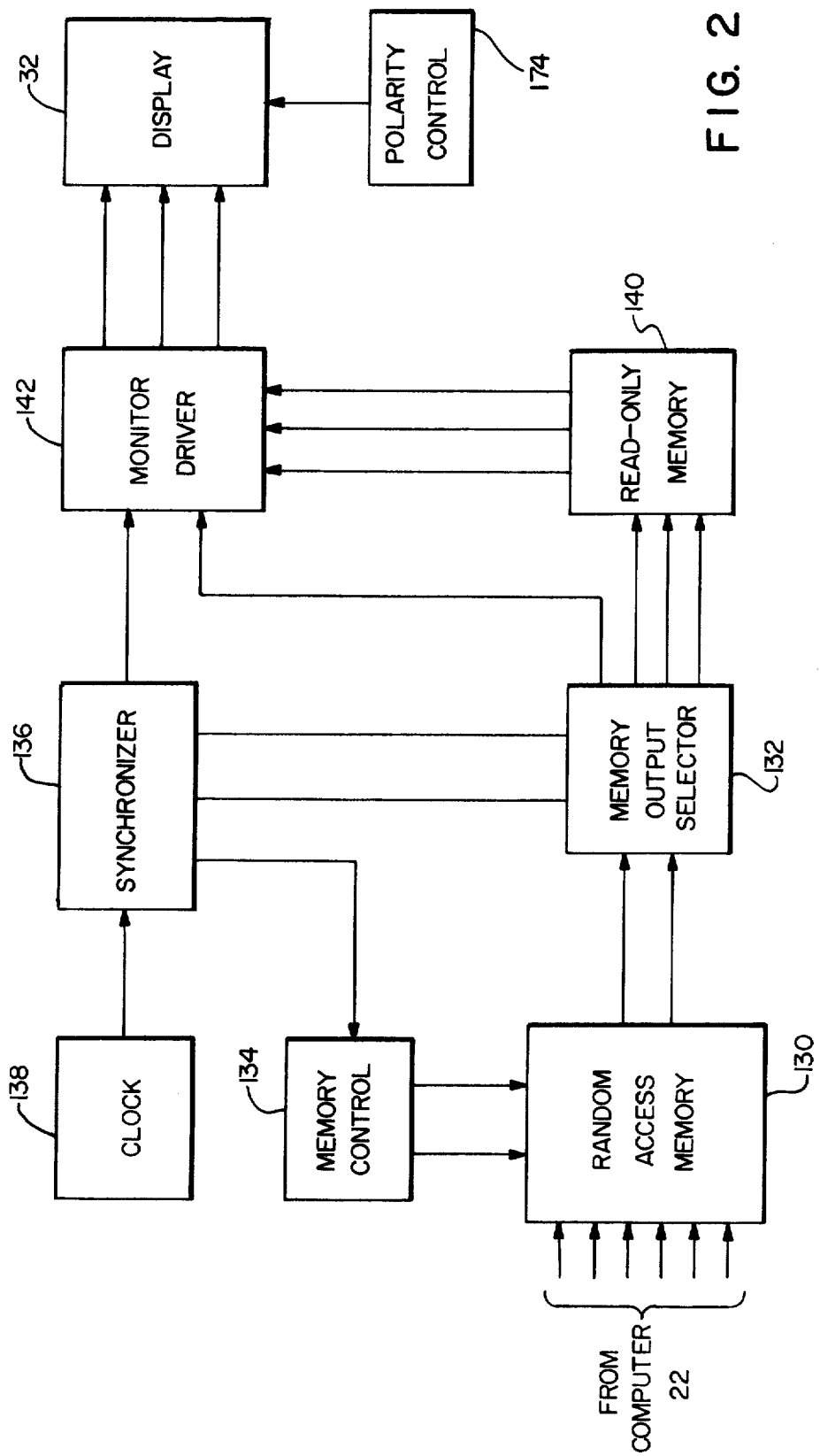
FIG. 2 is a block diagram of the halftone display system of FIG. 1.

Referring now to FIG. 2, it will be seen that conversion unit 30 comprises a random access memory 130 which receives the normalized Gray scale coded signals generated by computer 22. The normalized Gray scale coded signals are stored in random access memory 130 in address locations which correspond to the address locations in computer 22. The coded signals stored at each address location in random access memory 130 are selectively applied to a memory output selector 132 in response to address out signals generated by a memory control 134 which may be binary counters such as Texas Instrument Component SN 7493. Memory output selector 132 may be a 16 to 4 bit data selector such as a Texas Instrument Component Sn 7451 integrated circuit. Timing signals generated by a synchronizer 136 in response to clock pulses generated by a clock 138 are fed to memory control 134 and memory output selector 132 for control thereof. The normalized Gray scale coded signals addressed out of random access memory are gated in memory output selector 132 with timing signals generate by synchronzier 136. Character coded signals are generated by a read-only memory 140 in response to the signals generated by memory output selector 132 and are applied to a monitor driver 142. Monitor drive 142 may be comprised of a digital data selector such as Signetics 8232 and 8T13 integrated circuits. Timing signals generated by synchronizer 136 and code control signals generated by memory output selector 132 operate to control the operation of monitor driver 142. Display drive signals are generated by monitor driver 142 and are fed to display 30 for presentation of a halftone image. The display drive signals are gated with timing signals generated by synchronizer 136 for controlling the number of dot picture elements per unit area for each picture element presented on display 32.

Referring now to the detailed schematic of FIG. 3, it will be seen that synchronizer 136 comprises a synchronzier generator 144 and dividers 146, 148, 150 and 152. In the illustrated embodiment, by way of example, dividers 146, 148, 150 and 152 are divide by two, divide by four, divide by six and divide by twelve, respectively. Synch pulses generated by synchronzier generator 144 and the clock pulses divided by twelve as at the output of divider 152 are applied to memory control 134, for example a read address counter. The operation of read address counter 134 is such that, for every twelfth clock pulse, a new address location is read out of random access memory 130. That is, the normalized Gray scale coded signals generated by computer 22, for example sixteen bit signals, and stored at corresponding address locations in random access memory 130 are selectively applied to a multiplexer 154 which breaks up the sixteen bit signals into either two or four bit signals depending upon the field to be presented on display 32. A code control 156 receives a coded signal generated by computer 22 and determines the field to be presented on display 32. Code control 156, for example a presettable binary counter, selectively enables either divider 146 or divider 148 for controlling the signals presented at the output of multiplexer 154. The two or four bit signals generated by multiplexer 154 are applied to character generators 158, 160 and 162 which are gated by the clock pulses generated by clock 138. In the illustrated embodiment, by way of example, character generator 158 is an alphanumeric character generator, character generator 160 is a Gray field character generator, character generator 162 is a Gray field character generator and character generator 164 is a curve character generator. Character signals generated by character generators 158, 160, 162 and 164, which may be Signetics 2513 character generators, are loaded in parallel into shift registers 166, 168, 170 and 172, respectively. By way of example, shift registers 166 and 168 are six bit shift registers, shift register 170 is a four bit shift register and shift register 172 is a one bit shift register. Shift registers 166 and 168 are gated by the clock pulses generated by clock 138 and the divided clock pulses as at the output of divider 150. The signals at the output of character generators 158 and 160 are loaded into shift registers 166 and 168, respectively when the clock pulses and divided clock pulses applied to shift registers 166 and 168 are coincident. The loaded signals are shited serially in shift registers 166 and 168 by each clock pulse which is not coincident with the divided clock pulse. Shift register 170 is gated by the clock pulses generated by clock 138 and the divided clock pulses as at the output of divider 140. The signals at the output of character generator 162 are loaded into shift register 170 when the clock pulses and the divided clock pulses applied thereto are coincident. The loaded signals are shifted serially in shift register 170 by each clock pulse which is not coincident with the divided clock pulse. Character generator 164 receives signals from multiplexer 154, code control 156 and synchronizer generator 144. Character generator 164 counts the number of lines to be presented on display in response to the signal generated by code control 156 and compares a specified count with the signal generated by multiplexer 154. Curve data generated by character generator 164 is fed to shift register 172 which is gated by the clock pulses. The signals generated by shift registers 166, 168, 170 and 172 are applied to monitor driver 142. A signal from code control 156 operates to control monitor driver 142 in such a manner that signals from a selected character generator are applied to display 32. A polarity control 174, which may be a toggle switch in combination with an exclusive OR gate such as Texas Instrument Component SN 7486, generates a command signal which determines whether the image presented on display 32 is a positive or a negative image.

Figure 4:
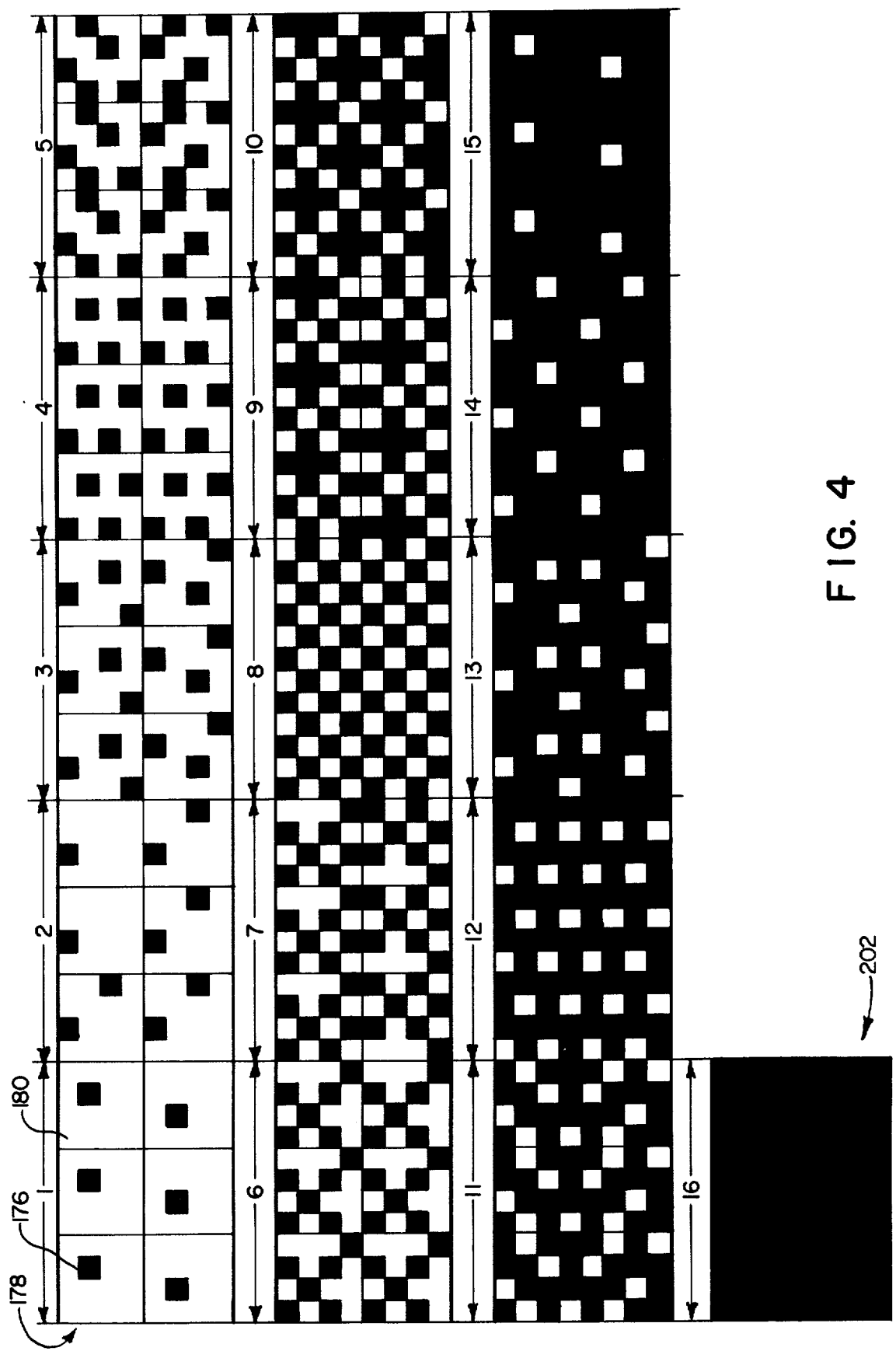
FIG. 4 is a graphical representation illustrating one scheme of picture dot element presentation.
Figure 5:
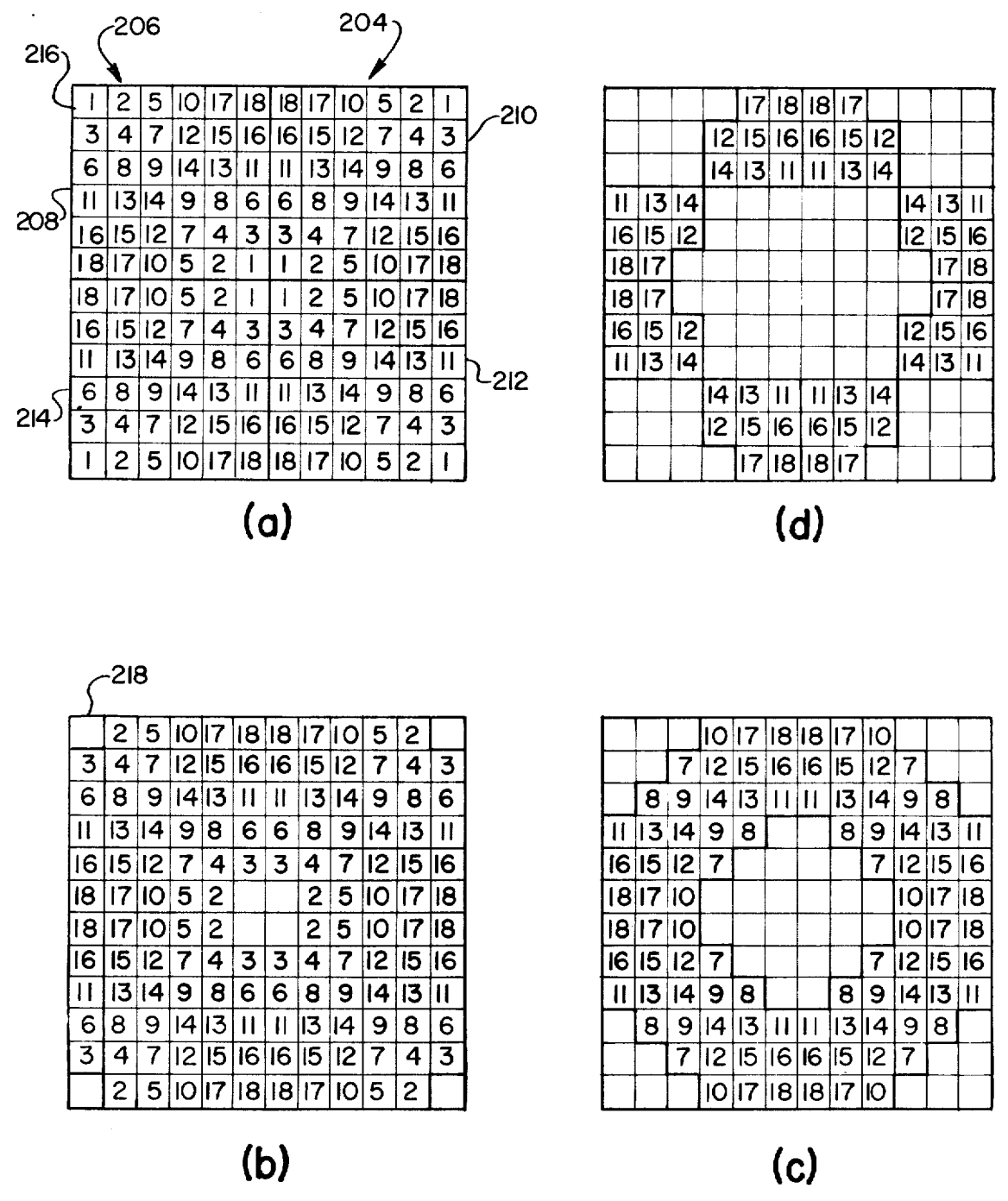

Halftone images are presented on display 32 by selectively actuating display 32 in such a manner as to control the number of picture dot elements per unit area for each picture element. In the illustrated embodiment, by way of example, sixteen shades of gray are presented on display 32 as a function of the number of radioactive events detected at each XY location of array 16. That is, as previously indicated, the radioactive events detected at each XY location of array 16 are accumulated in corresponding address locations in computer 22. The number of events stored in computer 22 for each XY location is normalized into Gray scale coded signals as a function of the greatest number of events at any one location. That is, the greatest number of detected events at any one address location is denoted by the number sixteen and the least number of detected events at any one address location is denoted by the number one. The number of detected events at each of the remaining address locations is denoted by a number between one and sixteen, the greater the number of detected events being denoted by larger numbers and the lesser number of detected events being denoted by smaller numbers. The normalized Gray scale coded signals are stored in random access memory 130 in address locations which correspond to the address locations in computer 22. Read address counter 134, which is gated with synch pulses generated by synchronizer generator 144 and the divided by twelve clock pulses generated by divider 152, operates to selectively address the sixteen bit normalized Gray scale coded signals out of random access memory 130 into multiplexer 154. That is, a new address location is applied to multiplexer 154 for every twelfth clock pulse. For the halftone presentations, multiplexer 154 is gated with the divided by four clock pulses which breaks up the sixteen bit signals into five bit signals. The five bit signals are applied in parallel to character generators 160 and 162. The signals generated by character generators 160 and 162 are loaded into shift registers 168, and 170, respectively. The serialized signals at the output of shift registers 168 and 170 are fed to monitor driver 142. Code control 156 operates in such a manner that the signals from a selected shift register are applied to display 32. By way of example, display 32 is an oscilloscope which includes a cathode-ray tube 176 having an electron gun 178, a pair of horizontal deflection plates 180, a pair of vertical deflection plates 182 and a fluorescent screen 184. In the illustrated embodiment, cathode-ray tube 176 is characterized by a five hundred and twenty-five line raster. An image is presented on cathode-ray tube 176 by first sequentially scanning an even field defined by every other raster line and then by sequentially scanning an odd field defined by the remaining raster lines. A halftone image is presented on cathode-ray tube 176 by selectively energizing electron gun 178 during the scanning period to control the number of dot picture elements per unit area for each picture element. That is, electron gun 178 is selectively energized during the scanning of each raster line as a function of the normalized Gray scale coded signals representing the number of detected events stored at each address location. FIGS. 4 and 5 illustrate alternative schemes of dot picture element placement within each picture element for presenting halftone images using character generators 162 and 160, respectively.

Referring now to FIG. 4, a picture element 192 which corresponds to one address location is defined by a four by four matrix 194 having sixteen like profile sections 196. One or more dot picture elements 198 are presented at predeterminate locations within matrix 194 for each address location as a function of the normalized Gray scale coded signal for that address location. The height and width dimensions of each section 196 and each dot picture element 198 are equal to the height dimension of a raster line. That is, each dot element 198 occupies an area defined by one like profile section 196. Dot picture elements 198 representing the normalized Gray scale coded signals in increments of one to sixteen are presented in FIG. 4. In the illustrated embodiment, by way of example, a like profile section 196 which is occupied by a dot picture element 198 defines an illuminated area and a like profile section 196 which is not occupied by a dot picture element 198 defines a darkened area. One dot picture element 198 per picture element 192, as shown at 200, describes the normalized Gray scale coded signal representing the least number of detected events at an address location; and sixteen dot picture elements 198 per picture element 192, as shown at 202, described the normalized Gray scale coded signal representing the greatest number of detected events at an address location. In the illustrated embodiment, the pattern presented by picture elements 192 containing nine dot picture elements 198 is the complement of the pattern presented by picture elements 192 containing seven dot picture elements 198. Similarly, the pattern presented by picture elements 192 containing 10, 11, 12, 13, 14 and 15 dot picture elements 198 is the complement of the pattern presented by picture elements 192 containing six, five, four, three, two and one dot picture elements, respectively.

As shown in FIG. 4 a picture element 192 in any one column that contains an odd number of dot picture elements 198 presents a reverted mirror image of the pattern presented in the adjacent row by a picture element 192 in the same column that contains a like number of dot picture elements 198. A picture element 192 in any one column that contains an even number of dot picture elements 198 presents a like image of the pattern presented in the adjacent row by a picture element in the same column that contains a like number of dot picture elements 198.

Referring now to FIG. 5a there is shown an alternative scheme for presenting halftone images using character generator 160. A picture element 204 which corresponds to one address location is defined by a twelve by twelve matrix 206 having four like six by six matrices 208, 210, 212 and 214. Each matrix 208, 210, 212 and 214 includes 36 like profile sections 216. Matrix 214 is the inverted mirror image of matrix 208, matrix 210 is the reverted mirror image of matrix 208 and matrix 212 is the inverted mirror image of matrix 210. As shown in FIGS. 5b, 5c and 5d, one or more dot picture elements 218 are presented at predeterminate locations within each matrix 206 for each address location as a function of the normalized Gray scale coded signals for that address location. The height and width dimension of each section 216 and each dot picture element 198 are equal to the height dimension of a raster line. Dot picture elements for normalized Gray scale coded signals representing one, six, and ten are shown in FIGS. 5b, 5c and 5d, respectively.

Since certain changes may be made in the foregoing disclosure without departing from the scope of the invention herein involved, it is intended that all matter contained in the above description and depicted in the accompanying drawings be construed in an illustrative and not in a limiting sense.

What is claimed is:

1. A device for presenting a halftone pictorial representation of radioactivity distribution within a specimen, said device comprising:
    a. means for detecting a number of radioactive events at X, Y locations within the specimen;
    b. computer means operatively connected to said detecting means for generating coded signals proportional to the number of radioactive events detected at each X, Y location;
    c. display means for presenting a pictorial representation comprised of a plurality of like profile picture elements, each said picture element defining a matrix having a plurality of like profile sections; and
    d. conversion means operatively connected to said computer means and display means, said coded signal selectively applied to said display means via said conversion means, said conversion means generating character code signals in response to said coded signals, said character code signals representing a specified number of dot elements per unit area for each said picture element, the number of dot elements per unit area in each said picture element defining a shade in the Gray scale, said dot elements and said sections having like profiles, said pictorial representation presented by said display means being a halftone presentation of radioactivity distribution within the specimen.

2. A device for presenting a halftone pictorial representation of radioactivity distribution within a specimen, said device comprising:
    a. means for detecting radioactive events at X, Y locations within the specimen;
    b. storage means operatively connected to said detecting means, said storage means including address locations corresponding to said X, Y locations within said specimen, the number of radioactive events detected at each said XY location accumulated at corresponding address locations;

c. computer means operatively connected to said detecting means for generating normalized coded signals proportional to the number of radioactive events accumulated at each said address location;

d. display means for presenting a pictorial representation comprised of picture elements, each said picture element defining a matrix having a plurality of like profile sections; and e. conversion means operatively connected to said computer means and display means, said normalized coded signals selectively applied to said display means via said conversion means, said conversion means generating character code signals in response to said normalized coded signals, said character code signals representing a specified number of dot elements per unit area for each said picture element, the number of dot elements per unit area in each said picture element defining a shade in the Gray scale, each of said dot elements having like profiles, said pictorial representation presented by said display means being a halftone presentation of radioactivity distribution within the specimen.

3. The device as claimed in claim 2 wherein said display means includes an oscilloscope.

4. The device as claimed in claim 3 wherein said oscilloscope is a cathode-ray tube oscilloscope including an electron gun, a pair of horizontal deflection plates, a pair of vertical deflection plates and a flourescent screen, said monitor driver means selectively energizing said electron gun during a scanning period, one of said dot elements presented on said flourescent screen when said electron gun is energized.

5. A device for presenting a halftone image comprising:

a. first means for generating coded signals representing an image to be presented, said image including a number of picture elements, each picture element having a number of dot elements;

b. second means operatively connected to said first means for generating normalized Gray scale signals related to said coded signals, said normalized Gray scale signals representing shades in the Gray scale;

c. conversion means operatively connected to said second means, said conversion means generating character code signals in response to said normalized Gray scale signals, said character code signals representing a specified number of dot elements for each said picture element;

d. display means including a plurality of like profile matrices defining an array, each said matrix including a plurality of like profile sections; and e. monitor driver means operatively connected to said second means and said display means, said monitor driver means generating display drive signals which are applied to said display means for selectively energizing said display means, dot elements presented by said display means in response to said display drive signals, each said dot element occupying an area defined by one of said like profile sections, said display drive means illuminating selected ones of said like profile sections occupied by said dot elements, other ones of said like profile sections defining darkened sections, the number of dot elements per unit area in any one of said like profile sections in conjuction with said darkened sections defining a shade in the Gray scale.

6. The device for presenting a halftone image as claimed in claim 5 wherein said picture elements are disposed in rows and columns, a picture element in any one column that includes an odd number of dot elements presents a reverted mirror image of a pattern presented in an adjacent row by a picture element in the same column that includes a like number of dot picture elements, a picture element in any one column that includes an even number of dot picture elements presents a like image of a pattern presented in an adjacent row by a picture element in the same column that includes a like number of dot picture elements.

7. The device for presenting a halftone image as claimed in claim 5 wherein each said matrix is a four by four matrix having sixteen like profile sections, any one of said matrix presenting an indication of Gray scale shading, said indication being one of sixteen shades in the Gray scale, a matrix containing nine, ten, eleven, twelve, thirteen, fourteen and fifteen dot elements presenting a pattern that is the complement of a pattern that is presented by a matrix containing seven, six, five, four, three, two and one dot elements, respectively.

8. A method of presenting a halftone image of radioactivity distribution within a specimen on a display matrix including a plurality of like profile picture elements, each said picture element having a number of like profile sections, said method comprising the steps of:

a. detecting the number of radioactive events at X, Y locations within the specimen;

b. generating coded signals of the detected radioactive events representing the image to be presented;

c. normalizing said coded signals into Gray scale coded signals defining shades in the Gray scale;

d. generating character code signals representing said normalized signals, each said character code signal defining a like profile dot picture element, the profile of each one of said picture dot elements corresponding to the profile of each one of said sections;

e. selectively applying said character code signals to a display; and f. presenting a halftone image of the radioactivity distribution on said display in the form of a composite array of like profile picture elements, each picture element including a number of like profile dot picture elements, one particular number of like profile dot picture elements per unit area in each picture element defining a particular shade in the Gray scale, other numbers of like profile dot picture elements per unit area in each picture element defining other shades in the Gray scale.

9. A method of presenting a halftone image of radioactivity distribution within a specimen comprising the steps of:

a. detecting the number of radioactive events at X, Y locations within the specimen;

b. generating coded signals representing detected radioactive events;

c. normalizing said coded signals, said normalized signals defining shades in the Gray scale;

d. generating character code signals representing said normalized signals, each said character code signals defining a like profile dot picture element;

e. selectively applying said character code signals to a display; and f. presenting a halftone image of the radioactivity distribution on said display in the form of a composite array of like profile picture elements, each said picture element including a number of said like profile dot picture elements, the number of said like profile dot picture elements per unit area in each said like profile picture element representing a shade in the Gray scale.

* * * * *